United States Patent [19]

Shannon

[11] Patent Number: 4,943,353
[45] Date of Patent: Jul. 24, 1990

[54] CONTROL FOR MODULAR WATER DISTILLER

[75] Inventor: David J. Shannon, Lincoln, Nebr.

[73] Assignee: Pure Water, Inc., Lincoln, Nebr.

[21] Appl. No.: 166,509

[22] Filed: Mar. 10, 1988

[51] Int. Cl.⁵ .......................... B01D 3/42; F16K 21/18
[52] U.S. Cl. ..................... 202/181; 202/202; 202/206; 202/270; 137/392; 203/1; 203/10; 203/DIG. 18; 203/DIG. 22; 307/118; 340/620; 340/623
[58] Field of Search ............... 202/202, 181, 206, 160, 202/270; 203/1, 10, DIG. 18, DIG. 17, DIG. 22; 137/392; 340/620, 623; 307/118

[56] References Cited

U.S. PATENT DOCUMENTS

| | | | |
|---|---|---|---|
| 2,079,897 | 5/1937 | Brown | 202/196 |
| 2,368,665 | 2/1945 | Kohman et al. | 202/49 |
| 2,388,599 | 11/1945 | Cleaver et al. | 202/174 |
| 3,055,810 | 9/1962 | Skow | 202/71 |
| 3,207,282 | 9/1965 | Norris, Jr. | 194/15 |
| 3,269,919 | 8/1966 | Baily et al. | 202/202 |
| 3,350,279 | 10/1967 | Tolchin | 202/83 |
| 3,445,344 | 5/1969 | Morton | 202/176 |
| 3,696,003 | 10/1972 | Fitch et al. | 202/160 |
| 3,825,491 | 7/1974 | Sanchez | 202/176 |
| 3,826,718 | 7/1974 | Takayasu | 202/181 |
| 3,896,004 | 7/1975 | Rodgers | 202/167 |
| 3,930,959 | 1/1976 | Kirschmann | 202/181 |
| 4,045,293 | 8/1977 | Cooksley | 203/10 |
| 4,110,170 | 8/1978 | Kirschman et al. | 202/160 |
| 4,259,982 | 4/1981 | Bartels | 137/392 |
| 4,482,891 | 11/1984 | Spencer | 340/620 |
| 4,525,243 | 6/1985 | Miller | 203/26 |
| 4,600,844 | 7/1986 | Atkins | 307/118 |
| 4,601,789 | 7/1986 | Bjorklund | 202/167 |
| 4,613,412 | 9/1986 | MacDermid | 202/202 |
| 4,622,102 | 11/1986 | Diebel | 202/202 |
| 4,687,550 | 8/1987 | Wong | 202/165 |

OTHER PUBLICATIONS

Copending Appl. S/N 030,353 for a Water Supply System, filed 3/26/87 (drawings enclosed).
Copending Appl. S/N 024,257 for a Water Purification Method & Apparatus, filed 3/10/87 (drawings enclosed).
Copending Appl. S/N 160,132 for a Water Distillation System, filed 2/25/88 (drawings enclosed).
Pure Water, Inc. Publication, "Aqua D Mark II, Instructions for Assembly and Operation", copyright 1985-see p. 9.
Pure Water, Inc. Publication, "MidiStill-MidiStill D, Instructions for Assembly & Operation", copyright 1981-see pp. 19 & 20.

Primary Examiner—Wilbur Bascomb
Attorney, Agent, or Firm—Price, Heneveld, Cooper, DeWitt & Litton

[57] ABSTRACT

A modular water distillation apparatus includes a distillation unit which may be manually operated by adding water manually to the steam generator. The apparatus further includes an add-on holding tank and an add-on control unit which mounts to the holding tank and provides automatic control of the distillation unit by providing feedwater to the steam generator when the steam generator is deenergized and the holding tank is not full. The add-on control further includes a power receptacle for an add-on distilled water demand pump.

12 Claims, 2 Drawing Sheets

CONTROL FOR MODULAR WATER DISTILLER

BACKGROUND OF THE INVENTION

This invention relates to water distillation apparatus and in particular to an add-on control unit for a modular distillation apparatus.

A water distillation apparatus including a steam generator and a condenser for condensing steam into distilled water is useful in improving the quality of water for domestic consumption. One such distillation apparatus is provided in modular form with a distillation unit and several add-on accessories that enhance the utility of the distillation unit. One add-on accessory is a large capacity holding tank to receive distilled water produced by the distillation unit. Another accessory is a level monitoring unit that may be mounted to the top of the holding tank in order to deenergize the still when the holding tank is full.

One prior art level monitoring unit 100 is shown in FIG. 3. This unit includes a base 101 that may be connected to a top 22 of the holding tank. A float assembly 102 extends through an opening 27 in the holding tank top and rises when the level increases beyond the location of float 102 illustrated in FIG. 3. Float 102 is connected to a power switch 103 and switches the contacts of switch 103 from a normally closed to an open state as float 102 rises. The contacts of power switch 103 are electrically connected in series between a power cable 104 and a receptacle 105. In such a prior art modular distillation unit, the still receives its power from receptacle 105. As long as the level of water in the holding tank is below the position of float 102, as shown in FIG. 3, the normally closed contacts of power switch 103 provide power from power cable 104 to the still to produce distilled water. As the holding tank becomes full, float 102 rises and eventually causes the normally closed contacts of switch 103 to open to remove power to the still.

The difficulty with such a prior art modular unit is that the level of distilled water in the holding tank rises very slowly. Even though power switch 103 is a snap-actuated switch, the slow rate of actuation of the switch by the float and the large current flowing through the switch to operate the still may cause extensive arcing and potential switch failure. In addition, the only function performed by the holding tank level monitoring unit is to disable the still when the holding tank is full. If the distillation unit is to be automatically controlled, i.e., not require manual filling, the basic distillation unit must come equipped with such control. This requires separate configurations of the distillation unit for manual versus automatic operation.

SUMMARY OF THE INVENTION

It is an object of the present invention to provide an add-on control unit for use with a modular distillation unit that overcomes the difficulties of switch contact arcing present in the prior art. It is yet another object of the present invention to provide such an add-on unit that performs a portion of the control function necessary to convert the distillation unit from a manually controlled unit to an automatically controlled unit, and in this manner, provide a greater range of flexibility in the potential configurations of a modular distillation unit.

The basic distillation unit used in the present invention has a basic control which allows the steam generator to be energized when there is sufficient water in the boiling tank and deenergizes the steam generator when the level of water in the boiling tank drops to a predetermined low level. When such a basic control is used alone, the boiling tank must be manually filled every time the water level drops to the predetermined low level. An optional add-on holding tank is provided for large capacity storage. An add-on control is provided for mounting to the top of the add-on holding tank. The add-on control operates with the basic control by automatically filling the boiling tank as required provided the holding tank is not full. If the holding tank is full, the add-on control disables the steam generator by withholding water from the boiling tank.

One embodiment of the invention includes a pair of level sensing probes extending through an access opening in the top of the holding tank to monitor the level of distilled water therein and a solenoid operated valve that is connected between a source of feedwater and an inlet to the boiling tank. The add-on control receives an indication from the distillation unit basic control whenever the steam generator is deenergized, which occurs when the water level in the boiling tank is low, and responds by opening the solenoid valve to add feedwater to the boiling tank until the water level reaches a predetermined high level. When this level is reached, the basic control responds by energizing the steam generator and the add-on unit responds to this energizing by closing the water valve. The add-on control additionally monitors the level of water in the holding tank and will only operate the feedwater valve when the level of water in the holding tank is below a predetermined level.

The advantage of an add-on control according to the present invention is that only low current control signals are switched by the add-on control. Further, the add-on control not only disables the still when the level of water in the holding tank indicates that the holding tank is full, but additionally cooperates with the basic control of the distillation unit to convert the distillation unit from a manual mode of operation to an automatic mode of operation.

These and other related objects, advantages and features of this invention will become apparent upon review of the following specification in conjunction with the drawings.

DESCRIPTION OF THE PREFERRED EMBODIMENT

Figure 1:
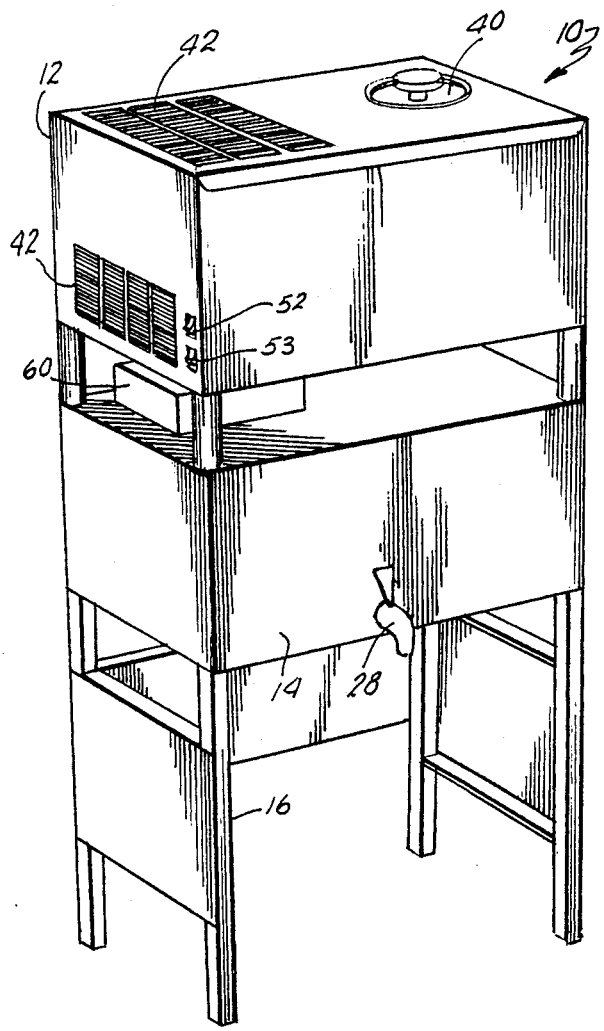
FIG. 1 is a front perspective view of a modular distillation apparatus.

Referring now specifically to the drawings, and the illustrative embodiments depicted therein, a modular water distillation apparatus 10 includes a distillation unit 12, which is the basic component required for producing distilled water. Apparatus 10 may additionally include a large capacity holding tank 14 to receive and store distilled water produced by unit 12. Holding tank 14 may be supported by an optional base 16. Distillation unit 12 includes a set of feet 18 which are adapted to support unit 12 on a countertop. Feet 18 are additionally adapted to extend over a set of studs 22 extending from the top of holding tank 14 so that distillation unit 12 may be supported on top of the holding tank. When unit 12 is supported on top of the holding tank 14, an outlet tube 24 from the distillation unit extends into an opening 26 in the holding tank to transfer distilled water to the tank. When distillation unit 12 is operated alone, outlet tube 24 may be connected by flexible tubing to a bottle or other suitable receptacle provided by the user. Holding tank 14, with unit 12 on top, may be supported as a unit on feet 23 on the bottom of the holding tank resting on a countertop. Tank 14 and unit 12 may also be supported on a floor by optional base 16 which includes openings 29 to receive feet 23 of the holding tank. Holding tank 14 includes a manually operable front spigot 28 (FIG. 1) for use in drawing distilled water from the tank and may also be equipped with an add-on demand pump 85 (FIG. 2) mounted on the back of base 16 for a more permanent installation.

Figure 5:
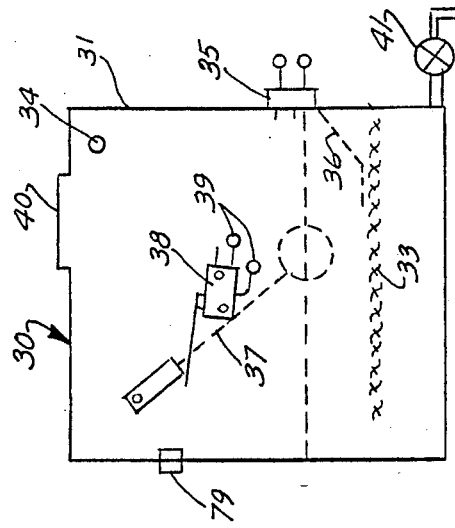
FIG. 5 is a schematic representation of the interior of the distillation unit steam generator.

Distillation unit 12 includes a steam generator generally shown at 30 (FIG. 5) having a boiling tank 31 and a resistance heating element 33 for converting water in the boiling tank to steam. Steam produced in the tank is conveyed through port 34 to a condenser (not shown) positioned in registry with air vents 42 in the cover of distillation unit 12 to provide appropriate air cooling of the condenser for condensing into distilled water. A thermostat 35 is provided to disable the distillation unit in the event of overheating. A heat shunt 36 extends between the heating element and the thermostat in order to transmit heat from the heating element to open the thermostat should the water level drop below the heating element.

Steam generator 30 further includes a float 37 which responds to the level of water in the boiling tank 31 and, in turn, actuates a switch 38. The float and switch are arranged such that the contacts 39 of switch 38 are normally closed when the level of water in the holding tank is at a predetermined low level and open when the level of water in the holding tank rises to a predetermined high level. Steam generator 30 further includes a covered access port 40 and a manually operable drain valve 41.

Figure 6:
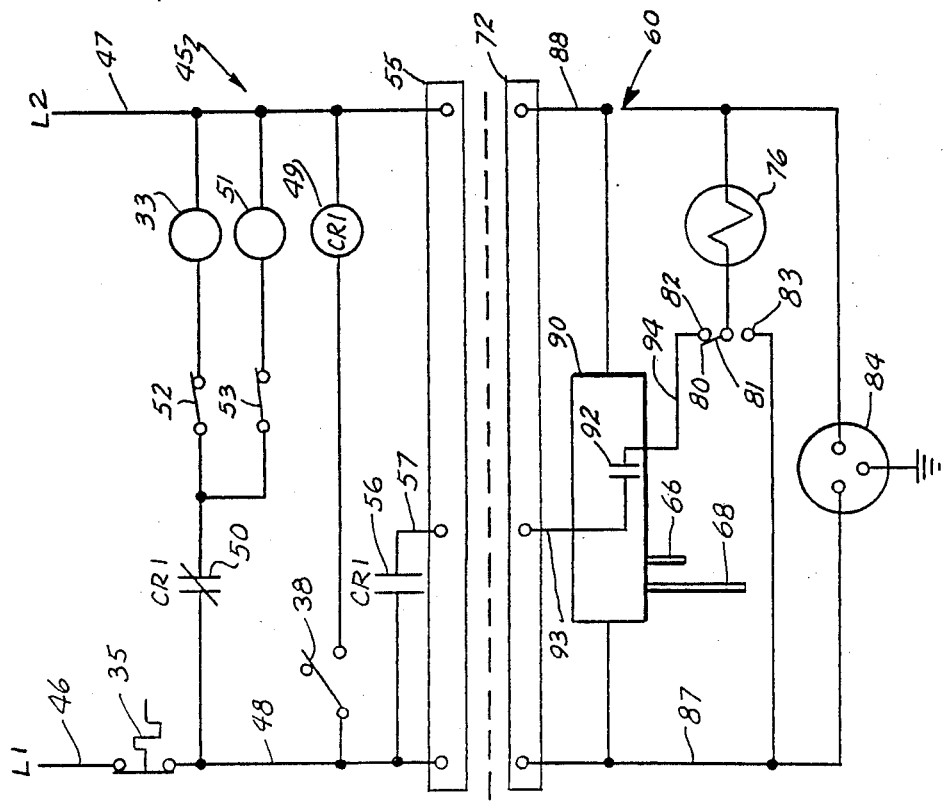
FIG. 6 is an electrical schematic of the basic control included with the distillation unit and an add-on control according to the invention.

Distillation unit 12 further includes a basic control unit 45, shown schematically in FIG. 6. Control unit 45 includes power lines 46 and 47 for supplying electrical power to the unit. Thermostat 35 is connected in series between power line 46 and a line 48 in order to disable the control if the temperature in the steam generator rises above the set point of the thermostat. Basic control unit 45 further includes a control relay 49, designated CR1, which is connected between lines 47 and 48 in series with boiling tank water level sensing switch 38. Heater 33 and a condenser cooling fan 51, which are connected in parallel, are connected between lines 47 and 48 in series with normally closed contacts 50 of relay CR1. A manual heater cutoff switch 52 is provided in series with heater 33 and a manual fan cutoff switch 53 is connected in series with fan 51.

The basic control unit 45 operates as follows. With the water level at a predetermined low level in the boiling tank, switch 38 will be closed and relay 49 energized. With relay 49 energized contacts 50 will be open so that heater 33 and fan 51 will be deenergized. In order to operate the still it is necessary to manually add water through access 40. When the level of water within the boiling tank is increased to a predetermined high level, switch 38 will open and relay CR1 will be deenergized. With relay CR1 deenergized, contacts 50 will close and heater 33 and condenser fan 51 will be energized, if manual switches 52 and 53 are in their closed positions. With heater 33 and fan 51 energized, the steam generator will produce steam and the condenser will condense the steam to distilled water. Eventually this process will cause the level of water in the boiling tank to drop to a level where switch 38 will again close to energize relay CR1 and deenergize the heater and fan. The boiling tank must then be refilled manually to continue production of distilled water. Manually operable switches 52 and 53 are provided to turn the distillation unit off irrespective of the level of water in the unit. Fan switch 53 is additionally provided to disable the condenser in order to allow steam to be conveyed from the steam generator to the holding tank (if one is provided) without first being condensed in the condenser in order to steam clean the holding tank.

Power lines 47 and 48 are additionally connected to terminals of a connector 55. Normally open contacts 56 of relay CR1 are connected between power line 48 and a terminal of connector 55. Because contacts 56 close when relay CR1 is energized, contacts 56 provide an indication of a condition in which the steam generator is deenergized which is dependent upon the level of water in the boiling tank.

Figure 4:
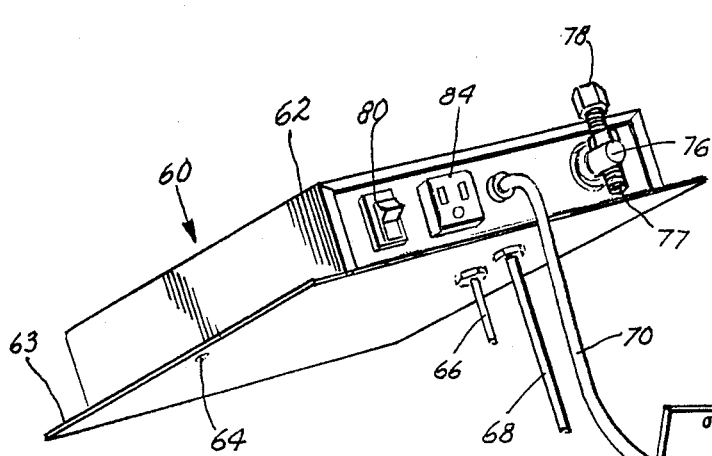
FIG. 4 is a bottom perspective of an add-on control according to the invention.
Figure 3:
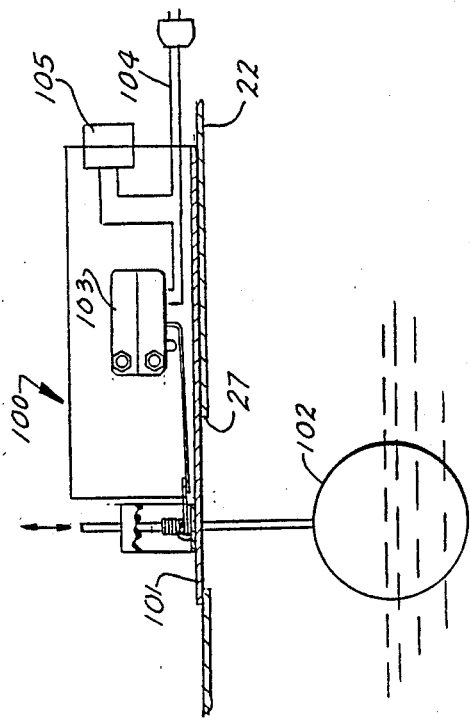
FIG. 3 is an elevation of a prior art add-on control.

An add-on control unit 60 is provided for distillation apparatus 10 in combination with an add-on holding tank 14 and distillation unit 12 in order to provide automatic control of the distillation apparatus. Control unit 60 (FIG. 4) includes a case 62 having a laterally extended base 63. An opening 64 is provided in base 63 on each end of the case. Each opening 64 is positioned to engage a threaded stud 25 extending upwardly from top 22 of holding tank 14. Nuts (not shown) may be applied to studs 25 to secure the control unit 60 to the holding tank. Studs 25 are positioned on opposite sides of an opening 27 in the holding tank such that add-on control unit 60 will cover the opening when studs 25 extend through opening 64 in the control unit base. Control unit 60 further includes a high level probe 66 and low level probe 68 extending downwardly from base 63 and into opening 27 of the holding tank.

Figure 2:
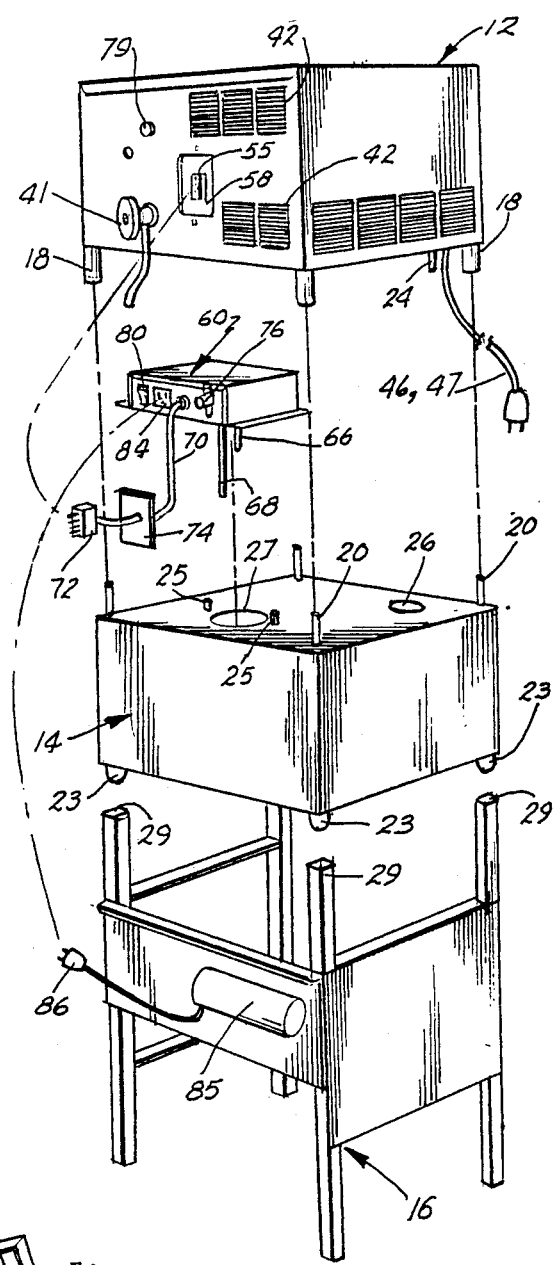
FIG. 2 is an exploded rear perspective view of the apparatus in FIG. 1.

Add-on control unit 60 includes a control cable 70 which extends from case 62 and terminates in a connector 72. Connector 72 is configured to mate with connector 55 of the distillation unit 12 which is positioned within a cavity 58 of the distillation unit (FIG. 2). A plate 74, which is configured to cover cavity 58, is firmly mounted on cable 70. When control unit 60 is used with distillation apparatus 10, a blank cover plate (not shown) is removed from cavity 58. The distal connector end of cable 70 is extended into cavity 58 and connector 72 is engaged with connector 55. A pair of sheet metal screws (not shown) are then used to anchor plate 74 over the opening of cavity 58 which also serves to hold connectors 55, 72 together.

Control unit 60 further includes a solenoid operated valve 76 mounted to case 62. Solenoid operated valve 76 is connected to the distillation apparatus by connecting an inlet 77 with a source of untreated water, such as a domestic water line, and an outlet 78 to an opening 79 in the boiling tank 31 by flexible tubing (not shown). Add-on control unit 60 further includes a manual water switch 80. Switch 80 is a single pole, double-throw switch having a movable contact 81 which is normally connected with a stationary contact 82 (FIG. 6). When switch 80 is manually actuated, contact 81 engages a second manual contact 83. When switch 80 is released, contact 81 returns into engagement with contact 82. The purpose of switch 80 is to allow the water valve 76 to be manually operated to fill the boiling tank for cleaning purposes.

Add-on control unit 60 further includes a receptacle 84 whose purpose is different from the still receptacle 105 provided in the prior art level monitoring unit. Receptacle 84 is provided with power at all times and serves as a convenience outlet for the plug 86 of an optional add-on demand pump 85. Add-on demand pump 85 is mounted to the rear of base 16 (FIG. 2). Its inlet port is connected to an opening (not shown) in holding tank 14 and its outlet may be connected to a stationary faucet for permanent installation in a house or other building. Demand pump 85 is of the type which responds to a drop in pressure at the outlet port and automatically activates the pump. Such pumps are commercially available and are sold by Shurflo, Inc., of Anaheim, Calif. under Model No. 2152-07-982-14.

Referring now to FIG. 6, add-on control unit 60 includes power lines 87 and 88 wired to connector 72 in a manner that these lines will connect with power lines 48 and 47, respectively, of the basic control 45 when connectors 55, 72 are engaged. Add-on control unit 60 further includes a differential water level monitor unit 90 to which probes 66 and 68 are electrically connected. Monitor unit 90 is an electronic continuity sensor and latch which is connected to lines 87 and 88 for receiving power and functions by monitoring the impedance between probes 66 and 68 and ground. When the level of water is below both probes, the impedance between each probe and ground is very high. In this condition, monitor unit 90 latches closed a set of control contacts 92. When the level of water in the holding tank rises, it will eventually engage low level probe 68, causing the impedance between probe 68 and ground to decrease. However, contacts 92 remain closed until the level of water in the holding tank further rises to the level where it engages high level probe 66, causing the impedance between probe 66 and ground to decrease. When the decrease in impedance between probe 66 and ground is detected by monitor 90, control contacts 92 are opened. Such an impedance-responsive latching water monitor is available commercially and is produced by SSAC of Baldwinsville, N.Y. under Model No. LLC24BIAN3187. A line 93 connects contacts 92 to connector 72 in a manner that it will engage line 57 extending from indicating contacts 56 when connectors 55 and 72 are engaged. Contacts 92 are additionally connected through a line 94 to contact 82 of manual water switch 80. The movable contact 81 of switch 80 is in turn connected with solenoid operated valve 76. Receptacle 84 is wired to lines 87 and 88 such that it will receive power whenever connectors 55 and 72 are engaged.

When distillation apparatus 10 is configured with add-on control 60 in combination with basic control 45 the operation is as follows. With both the boiling tank 31 and the holding tank 14 empty, boiling tank switch 38 and holding tank monitor control contact 92 will be closed. With switch 38 closed, relay CR1 is energized. Thus, contacts 50 are open and heater 33 and fan 51 are deenergized, so the steam generator is deenergized. Contacts 56 will be closed, which will establish continuity from power line 48, through connectors 55 and 72, holding tank level monitor control contact 92 and switch 80 to energize feedwater solenoid operated valve 76. This will open the feedwater valve and cause the level of water in the boiling tank to rise until it reaches a predetermined high level at which time switch 38 will open. When switch 38 opens, relay CR1 becomes deenergized. This causes contacts 50 to close which energizes the steam generator by energizing heater 33 and fan 51. In addition, relay CR1 being deenergized causes contact 56 to open. This closes feedwater solenoid operated valve 76. With steam generator 30 energized, steam will be produced and the level of water in the boiling tank will decrease until switch 38 again closes to start the above-described cycle over.

After multiple cycles of filling the boiling tank and energizing the steam generator to produce distilled water, the level of distilled water in the holding tank will rise and engage low level sensing probe 68. This will not cause a change in the state of holding tank level monitor control contacts 92 so the production of distilled water will continue. However, when the level of distilled water in holding tank 14 engages high level probe 66, water level monitor 90 will open control contacts 92. With contacts 92 in an open state, solenoid 76 will not be energized to admit water to the boiling tank when contacts 56 are next closed by relay CR1, indicating that the steam generator is deenergized. Therefore, when contacts 92 open, the operation of the still will be discontinued the next time that switch 38 closes to energize relay CR1 and deenergize the steam generator because no additional water is added to begin the next distillation cycle.

With the steam generator deenergized, usage of distilled water will cause the level to drop. The state of control contacts 92 will not change, however, when the level of water in the holding tank drops below high level probe 66. Rather, contacts 92 remain open until the level of water additionally drops below low level probe 68. At this point, control contacts 92 close. Relay CR1 will be energized because the steam generator previously terminated operation with switch 38 closed. Therefore, contacts 56 will be closed and solenoid operated valve 76 will be operated to again refill the boiling tank with feedwater and begin the cycle of production of distilled water.

The invention provides a wide range of options in a modular distillation apparatus. The distillation unit may be used alone in a manual mode with untreated water manually added to the boiling tank by the user and the output of the distillation unit supplied to a container provided by the user. Its basic control will, however, control the distillation process by energizing the steam generator when the user fills the boiling tank with untreated water and deenergizing the steam generator when the water in the boiling tank has dropped to a predetermined low level. The modular distillation apparatus further includes an add-on holding tank to provide a large capacity storage of distilled water to accommodate irregular usage patterns. The holding tank is configured to physically support the distillation unit. The combination may be supported on a countertop or on the floor by a separate support stand.

An automatic control unit may be added to the distillation apparatus in order to provide automatic control of the operation of the distillation apparatus. The automatic add-on control interacts with the basic control of the still in order to refill the boiling tank automatically whenever the level in the boiling tank drops to a predetermined low level unless the level of distilled water in the holding tank has increased to a predetermined high level, at which time the automatic control discontinues operation of the distillation unit by not refilling the boiling tank.

In yet a more sophisticated configuration, an automatic negative-pressure-actuated demand pump may be mounted to the holding tank and plumbed to a house faucet. The demand pump is conveniently powered from a convenience outlet provided on the automatic control and responds to the opening of the faucet to pump water from the holding tank to the faucet.

The automatic add-on control unit provided by the invention is easy to install. It is mechanically assembled to the holding tank by passing the water level probes through an opening in the holding tank. A control cable extending from the case of the add-on control unit engages with a connector on the distillation unit and a cover provided on the control plate covers the cavity in which the connection is made. The problem of contact arcing and resultant switch damage in prior art units is completely eliminated. The control unit does not supply power to the distillation unit. Rather, the distillation unit has a basic control that may operate by itself in a manual mode or in concert with the add-on control. The add-on control does more than disable the distillation unit when the holding tank becomes full. The add-on control regulates operation of the feedwater solenoid valve and therefore becomes an integral part of an automatic control of the distillation unit.

Changes and modifications in the specifically described embodiments can be carried out without departing from the principles of the invention. For example, the solid state holding tank water level monitoring unit could be replaced with a latching relay that is set and reset by a pair of microswitches operated by a float extending into the holding tank or, more basically, could be replaced by a single float-operated microswitch. The protection afforded the invention is intended to be limited only by the scope of the appended claims, as interpreted according to the principles of patent law including the Doctrine of Equivalents.

The embodiments of the invention in which an exclusive property or privilege is claimed are defined as follows.

1. A water distillation apparatus comprising:
    a stand-alone distillation unit adapted to semi-manual operation in which operation of the distillation unit is initiated to produce distilled water in response to the manual addition of raw water thereto and is terminated in response to said raw water being substantially converted to distilled water, said distillation unit having a steam generator including a boiling tank, means for manually adding water to said boiling tank, water level monitoring means for monitoring the level of water in said boiling tank and energizing means responsive to said monitoring means for energizing said steam generator when the level of water in said boiling tank is above a first predetermined level and deenergizing said steam generator when said level is below said first predetermined level, said distillation unit further including condensing means connected with said steam generator for condensing steam produced by said steam generator into distilled water;
    a holding tank adapted to receive distilled water from said condensing means; and
    an add-on control selectively connectable with said stand-alone distillation unit for converting said stand-alone distillation unit to an automatically controlled distillation apparatus, said add-on control including:
        holding tank water level monitoring means for monitoring the level of water in said holding tank;
        feedwater valve means configured to be connected to said steam generator and a source of water and operative for admitting feedwater to said steam generator; and
        control means responsive to said energizing means and said holding tank water level monitoring means for operating said feedwater valve means only when said level of water in said holding tank is below a second predetermined level and said steam generator is not energized in order to automatically fill the boiling tank when the level of water therein drops below said first predetermined level provided that the level of water in said holding tank is not above said second predetermined level and to disable the distillation unit when the level of water in said holding tank is above said second predetermined level by withholding feedwater from the steam generator when the level in the holding tank is above said second predetermined level.

2. The control in claim 1 in which said holding tank water level monitoring means further includes a latch, means responsive to said latch being set for operating said feedwater valve when said steam generator is not energized and setting/resetting means for setting said latch when the level of water in said holding tank is below a third predetermined level lower than said second predetermined level and for resetting said latch when the water in said holding tank is at said second predetermined level.

3. The control in claim 2 in which said holding tank water level monitoring means further includes first and second probes extending into said holding tank, said first probe extending to said second predetermined level and said second probe extending to said third predetermined level and said setting/resetting means comprises means for measuring the impedance between each of said probes and ground.

4. A water distillation apparatus comprising:
    a distillation unit and a holding tank connected to receive distilled water produced by said distillation unit, said distillation unit having steam generating means for converting water to steam including a boiling water tank, heating means for heating water in said boiling water tank and means for manually adding water to said boiling water tank;
    a first control unit adapted to stand-alone control of said distillation unit in a semi-manual mode in which said heating means is energized in response to the manual addition of water and is deenergized when the level of water in said boiling water tank drops below a first predetermined level; said first control unit including first water level monitoring means for monitoring the level of water in said boiling water tank and energizing means responsive to said monitoring means for energizing said heating means during a first condition when the level of water in said boiling water tank is above said first predetermined level and for deenergizing said steam generator during a second condition when said level of water in said boiling water tank is below said first predetermined level;

said first control unit further including condition responsive means responsive to the condition of said energizing means for assuming a first state when said heating means is not energized and a second state when said heating means is energized;

a second control unit selectively connected to said distillation apparatus and adapted to converting said distillation unit to automatic control, said second control unit including a second water level monitoring means for monitoring the level of water in said holding tank, a feedwater valve which is operative to admit feedwater to said steam generator, and operating means responsive to said condition responsive means and said second water level monitoring means for opening said feedwater valve when said level of water in said holding tank is below a second predetermined level and said condition responsive means is in said first state; and connecting means for selectively connecting said condition responsive means to said second control unit whereby said distillation unit may be operated semi-manually with only said first control unit or automatically with both said control units.

5. The apparatus in claim 4 in which said connecting means comprises a first connector associated with said first control unit and a second connector associated with said second control unit.

6. The apparatus in claim 4 in which said energizing means includes a relay and said condition responsive means comprises a set of contacts operated by said relay.

7. The apparatus in claim 6 in which said first level monitoring means comprises a float and a switch operated by said float and in which said relay is series connected with said switch.

8. The apparatus in claim 4 in which said second water level monitoring means further includes means for closing said feedwater valve when said level of water in said holding tank is above a third predetermined level higher than said second predetermined level.

9. The apparatus in claim 8 in which said second water level monitoring means includes first and second probes extending into said holding tank, said second probe extending to a lower level than said first probe and wherein said operating means comprises a latch connected to said feedwater valve, said latch being set by water contacting neither probe and reset by water contacting both said probes.

10. The apparatus in claim 9 in which said second control unit includes a case and said probes extend from said case into an opening in said holding tank when said case is mounted to said holding tank.

11. A water distillation apparatus comprising:

a distillation unit and a holding tank connected to receive distilled water produced by said distillation unit, said distillation unit having a steam generator;

a first control unit including first water level monitoring means for monitoring the level of water in said steam generator and energizing means responsive to said monitoring means for energizing said steam generator when the level of water in said steam generator is above a predetermined level and deenergizing said steam generator when said level is below said predetermined level, said first control unit further including indicating means responsive to said energizing means for indicating when said steam generator is not energized;

a second control unit including a second water level monitoring means for monitoring the level of water in said holding tank, a feedwater valve which is operative to admit feedwater to said steam generator, and operating means responsive to said indicating means and said second water level monitoring means for opening said feedwater valve when said level of water in said holding tank is below a first predetermined level and said steam generator is not energized; and means for closing said feedwater valve when said level of water in said holding tank is above a second predetermined level higher than said first predetermined level, said second control further including first probe and second probes extending into said holding tank, said second probe extending to a lower level than said first probe and wherein said operating means comprises a latch connected to said feedwater valve, said latch being set by water contacting neither probe and reset by water contacting both said probes, said second control unit further including a case and said probes extend from said case into an opening in said holding tank when said case is mounted to said holding tank;

a demand pump having an inlet connected to said holding tank and a power plug and in which said second control unit includes a power receptacle mounted to said case for receiving said plug and applying power to said demand pump; and connecting means for selectively connecting said control units whereby said distillation unit may be operated manually with only said first control unit or automatically with both said control units.

12. An add-on control for a semi-manually-operated water distillation apparatus including a distillation unit for producing distilled water and a holding tank connected to receive distilled water produced by said distillation unit, said distillation unit having a steam generator, said control comprising:

a solenoid operated valve configured for connection to said steam generator and to a source of water for admitting water from said source to said steam generator when said valve is operated;

monitoring means for monitoring the level of distilled water in said holding tank;

operating means for opening said valve to admit feedwater to said steam generator;

control means responsive to said monitoring means for inhibiting said operating means when the level of distilled water in said holding tank is above a first predetermined level and for enabling said operating means when the level of distilled water in said holding tank is below a second predetermined level below said first predetermined level;

said monitoring means including a case and first and second probes extending from said case into an opening in said holding tank when said case is mounted to said holding tank, said second probe extending to a lower level than said first probe; and wherein said means for inhibiting and for enabling are defined by a latch connected to said operating means and means for setting said latch when the level of water in said holding tank is below the level of both said probes and for resetting said latch when the level of water in said holding tank is at or above the level of both said probes.

* * * * *